US005898153A

United States Patent [19]

Lagan et al.

[11] Patent Number: 5,898,153

[45] Date of Patent: Apr. 27, 1999

[54] METHOD FOR PROCESSING MAIL IN A SWEEPSTAKES CONTEST

[75] Inventors: Thomas A. Lagan, Port Washington, N.Y.; Charlie H. Sims, Lithia Springs, Ga.

[73] Assignee: Publishers Clearing House, Port Washington, N.Y.

[21] Appl. No.: 08/754,444

[22] Filed: Nov. 21, 1996

Related U.S. Application Data

[63] Continuation-in-part of application No. 08/382,119, Feb. 1, 1995, Pat. No. 5,659,163.

[51] Int. Cl.[6] ............................ G06F 17/00; G06K 19/06

[52] U.S. Cl. ............................................ 235/375; 235/493

[58] Field of Search .................................... 235/375, 380, 235/462, 493; 364/478; 209/562, 567, 568, 583, 584

[56] References Cited

U.S. PATENT DOCUMENTS

| | | | |
|---|---|---|---|
| 3,933,094 | 1/1976 | Murphy et al. | 209/111.5 |
| 4,571,925 | 2/1986 | Adams | 53/502 |
| 4,796,196 | 1/1989 | Durst, Jr. et al. | 364/478 |
| 4,800,505 | 1/1989 | Axelrod et al. | 364/478 |
| 4,908,768 | 3/1990 | Gelfer et al. | 364/464.03 |
| 5,267,754 | 12/1993 | Kaule | 283/71 |
| 5,288,994 | 2/1994 | Berson | 250/223 |
| 5,659,163 | 8/1997 | Lagan et al. | 235/375 |

*Primary Examiner*—Thien Minh Le
*Attorney, Agent, or Firm*—Pennie & Edmonds LLP

[57] ABSTRACT

A method for automatically processing sweepstakes entries and mail orders is disclosed. The method reads a machine code identifying the sender and simultaneously detects orders from non-orders using a magnetic field detector, without opening the envelopes. The machine code is printed on the outside face of the envelope, or alternatively, on the reply insert itself, in which case it is visible through a die-cut window formed in the return envelope. When read, the machine code identifies the contestant and enters him or her into the sweepstakes. The returned envelopes are also fed through a sorter which magnetically detects whether each return envelope contains a magnetic order stamp. If the sorter detects a magnetic stamp, the envelope is routed to an order batch where the envelope is opened for order processing, otherwise the envelope is routed to a non-order batch. During the outgoing mail processing, a machine code indicative of the recipient may be preprinted on each carrier envelope or reply insert. This code may be read and used to print a machine code corresponding thereto on the return envelope. The return envelope and the reply insert, along with order stamps each having a magnetic ink layer, are inserted into the carrier envelope and mailed out to the recipient.

19 Claims, 3 Drawing Sheets

FIG. 3
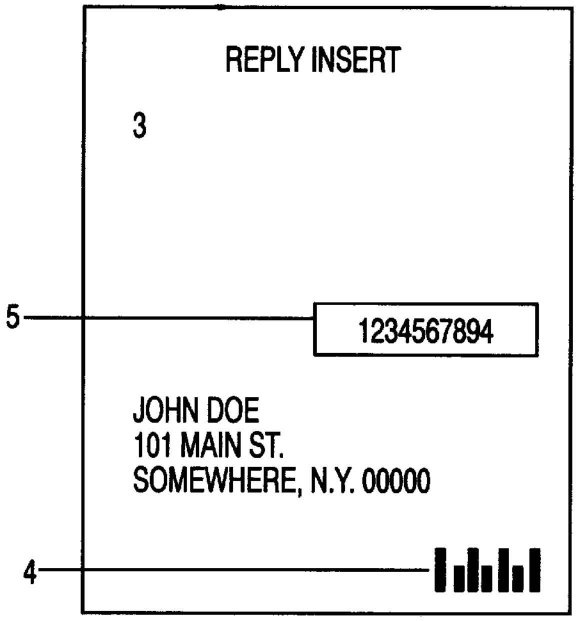
FIG. 4
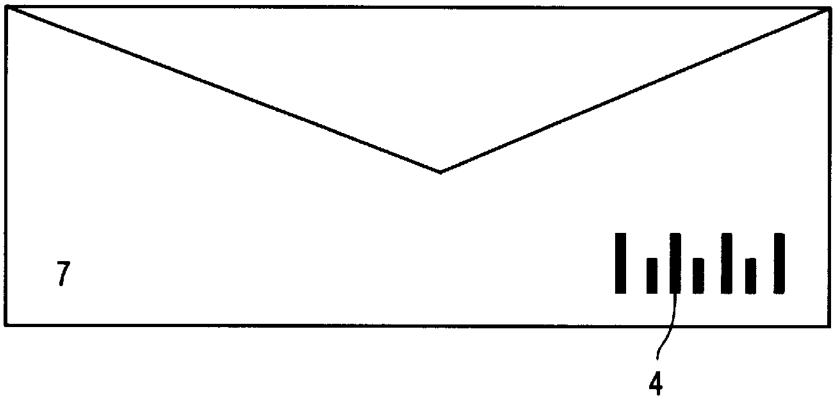
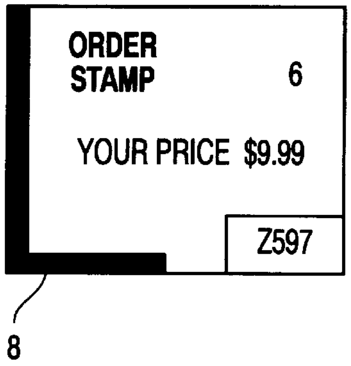
FIG. 5

METHOD FOR PROCESSING MAIL IN A SWEEPSTAKES CONTEST

This is a continuation-in-part of application Ser. No. 08/382,119, filed Feb. 1, 1995 now U.S. Pat. No. 5,659,163.

BACKGROUND

Automated mail processing systems have been contemplated to process a high volume of mail at ever increasing speeds with the aim of reducing cost. Automated mail processing systems generally process mail by sorting incoming mail and match mailing outgoing mail. Mail sorting typically relies on the address or the code either printed on the outside face of the envelope or visible through a window provided in the envelope. Information printed on the outside the envelope or visible from the outside is typically read using an electronic reading device such as a relatively expensive optical character recognition (OCR) device, an image scanner, a bar code reader, a magnetic code reader, etc.

In automated match mailing processing systems, as described for example in U.S. Pat. No. 4,800,505 to Axelrod, an inserting apparatus or inserter is used with a carrier or insert having a machine readable code printed thereon corresponding to a match mailing identification that can be used to determine the items to be included in the outgoing mail. Similarly, U.S. Pat. No. 4,908,768 issued to Gelfer et al. uses a printer to imprint a machine readable code commonly known as a "dash code" onto a mail insert. The dash code typically represents the zip code of the addressee. A controller formats the information relating to each piece of mail obtained from the code and commands a printer to print out a manifest of the type and form that is acceptable to the mail service provider.

Alternatively, the documents themselves to be mailed can be marked with a machine code such as a dash code. The dash code information can then be automatically scanned for further processing. For example, the scanned information can be used to select and assemble the preselected documents into a single envelope for further processing, as described for example in U.S. Pat. No. 4,571,925 issued to Adams.

U.S. Pat. No. 4,796,196 to Durst, Jr. et al. further describes an automated outgoing and incoming mail processing system. In this system, a return stationery, such as a bill, and a return envelope with a code identifying the addressee printed thereon are generated or formatted for the outgoing mail. A conventional sorting module is used to read the pre-printed code on the return envelopes of the incoming mail to automatically process them.

In this regard, U.S. Pat. Nos. 4,445,635 issued to Barr and 3,933,094 issued to Murphy et al. also describe a use of return envelopes having a machine readable code such as an optical character recognition, color coding or magnetic marking pre-printed on the outside face of the envelope that can be read by a mail processing machine. Further, U.S. Pat. Nos. 5,267,754 issued to Kaule and 3,652,830 issued to Kessler describe postage stamps with a machine readable marking printed or coated thereon that can be attached to any envelope for automatic mail processing.

Automatic mail processing systems typically rely on some form of a machine code that is visible on the outside face of the envelope or visible therethrough. If the code is not visible or missing, then the systems cannot sort automatically and it is necessary to resort to the conventional time-consuming manual sorting and/or processing. It is desirable to automatically process mail even in situations where the codes are not visible or are otherwise missing. In this regard, U.S. Pat. No. 5,288,994 issued to Berson describes an image detecting apparatus and method for reading and/or verifying the contents in the sealed envelopes. The '994 patent detects the contents in the sealed envelopes by optically reading pre-encoded marks formed on the content, such as a reply insert or carrier. A rather expensive image analysis system is required to reconstruct the image of the pre-encoded mark or to identify the pattern of the contents such as checks, business forms, payment stubs, etc. Moreover, to enable the analysis system to read through the sealed envelopes, the envelopes have to be transparent to various frequencies of light, especially near an infrared region.

It is common for mail order businesses and related industries to generate sales by mailing promotional packages, usually in very large volumes, to groups of predetermined customers or new prospects. For example, various mail order businesses offer sweepstakes prize awards on their promotional mailings to increase the recipients' attention to their product offerings. Specifically, these businesses invite customers to order products such as magazines and offer them the chance to enter a sweepstakes contest by mailing back the preaddressed courtesy return envelope provided to them. The customers that promptly return their order/entry document are entered into the sweepstakes contest regardless of whether any product is ordered.

These promotional mailings usually generate a tremendous volume of customer responses which must be promptly and accurately processed. Weekly volumes of return mail from promotional mailings can total in the millions during peak seasons and must be processed expeditiously to provide timely delivery of products and entry into the current sweepstakes awards. Some known current return mail processing consists of a combination of automated and manual procedures that are labor intensive. Automated bar code reading equipment is used to separate incoming customer response mail into various categories, basically sorting the returns generated by each different promotional mailing into separate groups. All return envelopes are then put through automated sorters, such as a DOCUTRONIX™, which, in a single pass, top slit each envelope and separate envelopes containing contest entries into an order batch and a non-order batch. The DOCUTRONIX™ machine performs this separation by detecting the presence of magnetic ink placed on the order coupons. However, this machine is subject to an error factor of about 4%. Although all customer responses are subsequently processed for contest entry, the order batch must be separated for order processing.

While the two aforementioned steps enable a relatively quick separation of return envelopes into various categories, they only represent a small portion of the labor required to handle customer responses. Most notable are the ensuing processes of taking out the contents from the pre-slit envelopes and preparing their contents for data capture via either a high-speed OCR scanning device or manual key entry. Such process of taking out the content of each envelope and preparing for further processing is defined as "outsorting." The labor cost for this manually performed function alone is in the millions of dollars annually.

The direct mail industry and its related industries, are faced with ever increasing costs and the need to compress the time frames required to process huge volumes of customer responses. These costs include those related to machine-sorting return envelopes, manually outsorting their contents and then capturing the customer's preassigned ID number for entry into the contest and manually processing any magazine/product orders. Given the significant expense and time-consuming nature of the manual outsorting process described above, as well as the time and costs involved in the subsequent scanning and manual key entry processes that follow, there is a need for automating incoming mail processing. In particular, it is highly desirable to identify the customer associated with each return envelope and process their response mail without ever opening the envelope. This would provide a significant savings in labor and a competitive advantage. Furthermore, it is particularly desirable to automatically distinguish between orders and non-orders, without having to first open the return envelopes and to replace manual outsorting to reduce cost and increase speed.

Although some gains could be realized in the short term by using return envelopes with die-cut windows that would expose order, non-order and sweepstakes numbers, all of which can be scanned without first sorting or opening on current optical scanning optical devices, the savings would be minimal in the long run. Additionally, if the contestant does not properly enclose the insert, the order/non-order and contest numbers would not be detected, thus still requiring expensive manual outsorting.

SUMMARY

The present invention relates to a method for sorting incoming mail without opening the envelopes. Each piece of incoming mail includes a reply insert. As it arrives, the sender of the incoming mail is automatically entered into the sweepstakes contest and the incoming envelopes are sorted into one of two groups, one containing orders, and one without orders. All of this is performed without opening the envelope. Entering the sender in the contest, and sorting the mail into order and non-order groups, are both performed without opening the envelopes.

To accomplish this, the outgoing mailings must be properly prepared so that the customer responses to these mailings can be automatically processed. The outgoing mailing comprises an outgoing envelope, a reply insert, which may serve as an order form, a plurality of magnetic stamps, each corresponding to an item that may be ordered, and a return envelope.

Each recipient of an outgoing mailing is given a unique ID number which is printed on the reply insert. The ID number also may appear, perhaps in coded form, on the return envelope. Alternatively, the return envelope may be provided with a die-cut window through which the ID number or the machine code can be viewed.

On the incoming side, the automated system comprises a sorter having a magnetic reader and a machine code reader. The magnetic reader, which is responsive to a detection of a magnetic field, detects the presence of magnetic order stamps returned by the customer to indicate their order selections. Each of these stamps has a magnetic layer that can be detected through the envelope. The envelopes are directed into one of two bins depending on the outcome of the magnetic read operation.

The machine code reader tries to determine which of the recipients returned a sweepstakes reply insert. For this, the machine code reader looks for a machine code such as a bar code (UPC), dash code POSTNET codes, "POST-NOT" code (defined below), or the like, printed either on the return envelope, or on the reply insert. The machine code may also be the ID number itself.

Only the envelopes in which a magnetic stamp is detected need to be opened. Thus, all sweepstakes entries, whether with or without orders, can be advantageously processed without opening the envelopes using the machine codes. Since the non-orders do not have to be opened at all, the mail processing according to the present invention is efficient and reduces the cost thereof.

A mailer unit according to the present invention may also include a conventional inserter. However, according to the present invention, the inserter is provided with a machine code reader connected to a machine code printer. The mailer unit processes outgoing mail by reading the machine code from a control document which can be either an outgoing envelope or a reply insert having a preprinted machine code. The read machine code is then used to control the printer to print a machine code on the return envelope. The outgoing envelope is used to contain all of the outgoing documents for each recipient such as a return envelope, a reply insert and magnetic order stamps. In this regard, if the control document is a reply insert, the carrier envelope can have an open window through which the address printed on the reply insert is visible. The machine code type on the carrier envelope and the return envelope can be different. For example, the carrier envelope and the insert can have a UPC code and the return envelope can have a POSTNET or "POST-NOT" code.

In operation, a contestant wishing to order would attach one or more of the magnetic stamps corresponding to the item(s) to be ordered onto a reply insert, such as a preprinted sweepstakes entry form. Conversely, a contestant wishing to just enter the sweepstakes without ordering would just enclose the reply insert without any order stamp. The return envelopes received from the recipients (senders) are collected and fed through the sorter, upon which the sorter will detect presence or absence of an order stamp while the machine code reader will identify the sender/contestant for instant sweepstakes entry.

The sorting between orders and non-orders and identification of the sender/contestant are performed substantially simultaneously, reducing the mail processing step. The machine code printed on the outside face of the return envelope, or, alternatively, visible through the die-cut window, is read. This code is matched with the contestant information contained in the database, including the sweepstakes number preselected for that contestant, for automatic sweepstakes entry.

If the sorter detects no magnetic stamp in the sealed envelope, it is routed to a non-order batch for possible remailing within a predetermined period. If, on the other hand, the sorter detects the presence of any magnetic stamp in the sealed envelope, it is routed to an order batch where the envelope can be opened for order processing.

BRIEF DESCRIPTION OF THE DRAWINGS

These and other features, aspects, and advantages of the present invention will become much more apparent from the following description, appended claims, and accompanying drawings where:

FIG. 3 is a schematic diagram of a reply insert having a machine code.

FIG. 4 is a schematic diagram of a carrier envelope.

FIG. 5 is a schematic diagram of an order stamp with a magnetic ink applied thereto.

DESCRIPTION OF THE DRAWINGS

Figure 1:
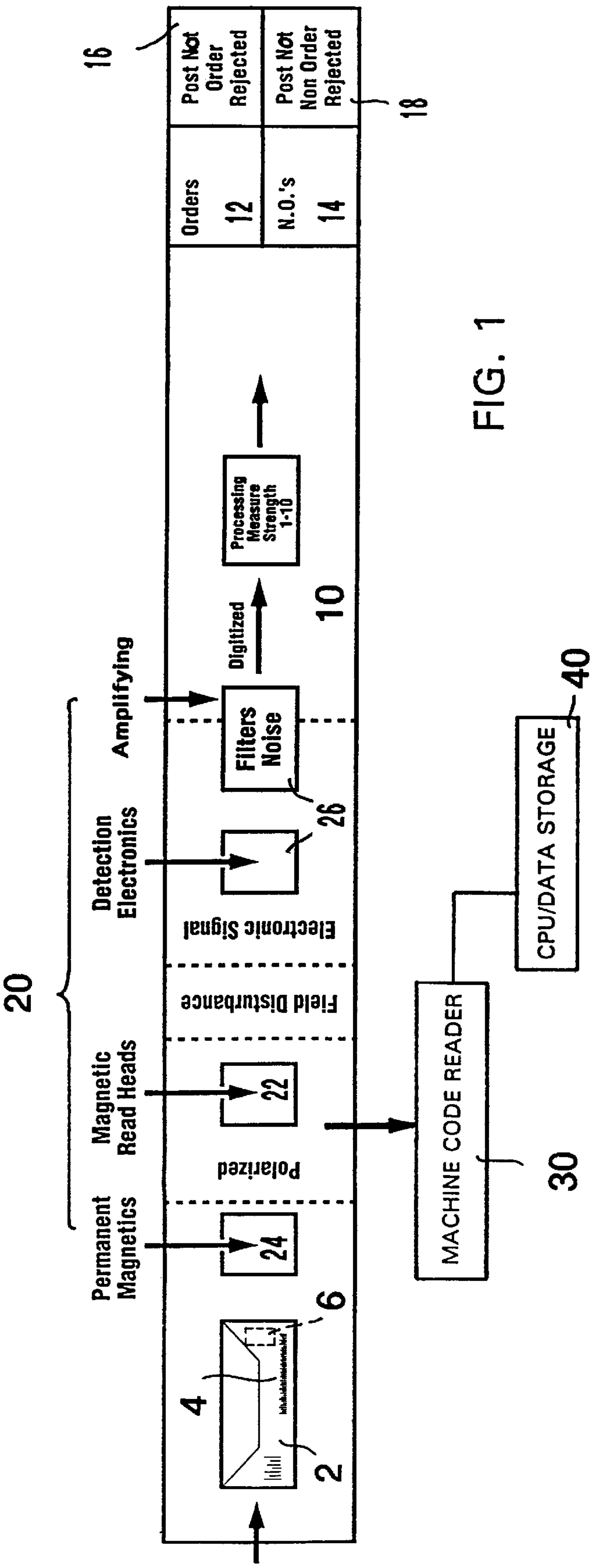
FIG. 1 is a schematic block diagram of the incoming mail processing system according to the present invention.

The present invention eliminates manual outsorting and can automatically process sweepstakes entries without opening the incoming mail. Specifically, as shown FIG. 1, the automated system for processing incoming mail according to the present invention comprises a sorter 10 currently available from Postal Technologies, Inc. (PTI). The PTI sorter includes a machine code reader 30 for reading a POSTNET or a numeric zip code, or an OCR device for reading characters. However, according to the present invention, the sorter is additionally equipped with a magnetic field detecting device 20. The detector 20 comprises at least one magnetic read head 22 capable of detecting a magnetic field emanating from an order stamp 6 or any other magnetic source contained within the return envelope 2. The sorter is provided with a transporting mechanism for sequentially moving the envelopes through the detector and the machine code reader 30.

The magnetic field detecting device 20 preferably includes at least one permanent magnet or a series of permanent magnets 24 positioned upstream of the magnetic read head to further enhance magnetic detection of the magnetic ink layer on the order stamp 6. This is accomplished by charging the magnetic ink layer with the magnetic field generated by the magnets to thereby align or polarize the magnetic poles. The device 20 also includes detection electronics, including noise filters, etc., i.e., circuitry, necessary to process and identify the strength of magnetic field detection. Based on the strength detected, the envelope can be routed to either an order batch 12 or non-order batch (N.O.'s) 14.

It is desirable to use a POSTNET code because it can be scanned much faster than a conventional UPC code. However, use of a POSTNET code on the outside face of the envelope is not particularly desirable because the scanning devices used by the U.S. postal service may erroneously read this code as a zip code. Accordingly, the present inventor has created a "POST-NOT" code that is capable of being scanned at the same speed as the POSTNET code, but cannot be confused with a POSTNET code representative of the zip code. A UPC code can be used if the speed of processing is not particularly critical, such as during outgoing mail processing.

In this regard, the PTI sorter is provided with a programmable machine code reading device 30 that is capable of being programmed to read different types of machine codes, including POSTNET and "POST-NOT" codes. In essence, the role of the long and short bars of the "POST-NOT" code is reversed from the POSTNET code. Specifically, the "POST-NOT" code is substantially identical to the POSTNET code, except that whereas the short bar of the POSTNET code is used to signify a numerical value other than null, the long bar of the "POST-NOT" code is used to signify a numerical value. Moreover, whereas the first and the last bars of the POSTNET are always long, in the "POST-NOT" code, the first and last bars are always short. This enables the machine code reader to distinguish the "POST-NOT" code from the POSTNET code.

According to the present invention, the machine code reader 30 reads or scans the machine code 4 substantially simultaneously with the magnetic sorting step. If the code is printed on the outside of an envelope, as shown in FIG. 4, it is preferably a "POST-NOT" code. If the code is printed on the sweepstakes entry itself, it may again be a "POST-NOT" code, or, more preferably, the 10-digit ID number itself. When the machine code is not readable, for instance, due to smears or a partially erased machine code, the envelope is routed to either "POST-NOT" order reject batch 16 or a "POST-NOT" non-order reject batch 18 for further appropriate processing.

Figure 2:
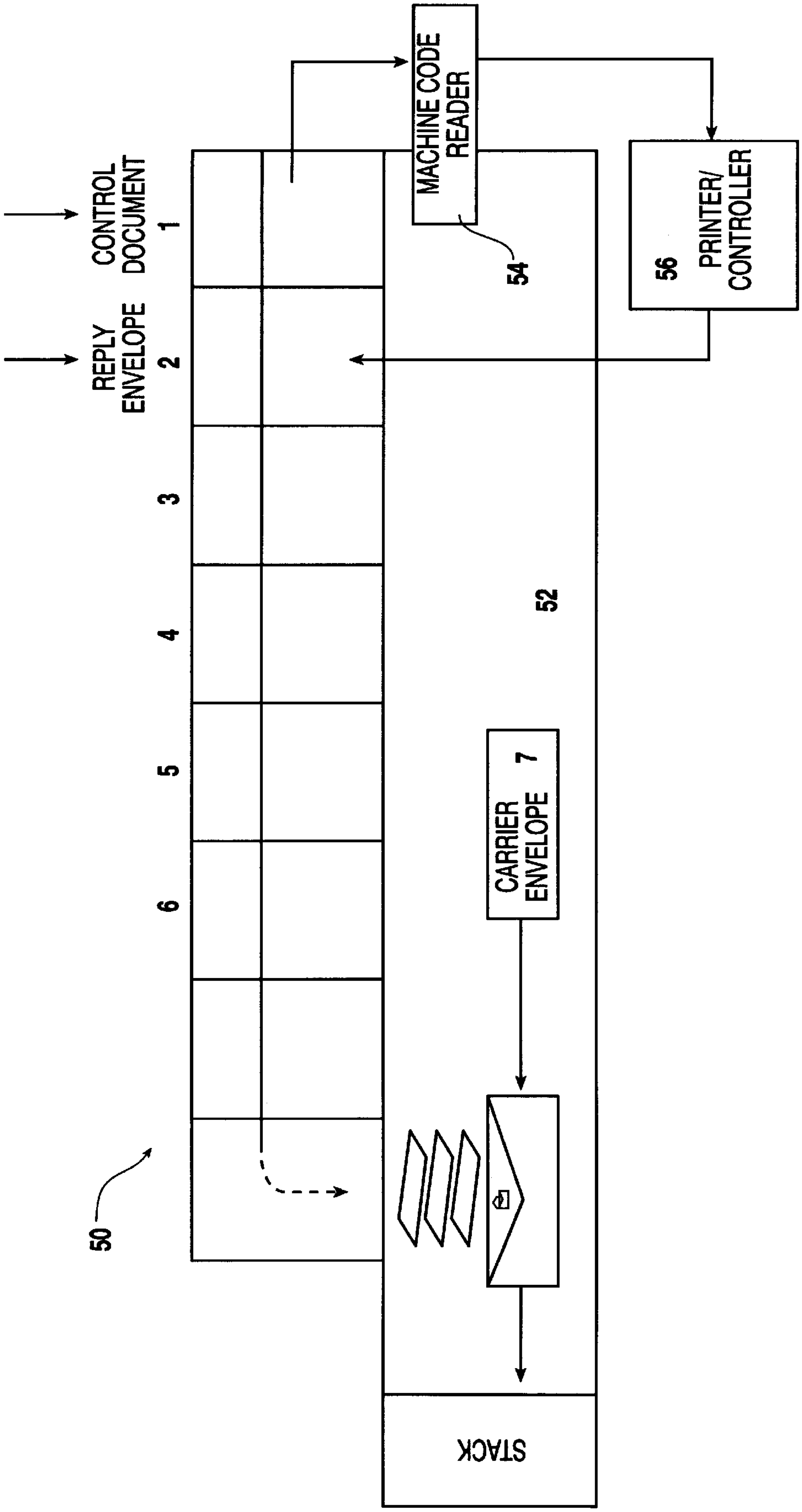
FIG. 2 is a schematic block diagram of the outgoing mail processing system according to the present invention.

As shown in FIG. 2, the mailer unit 50 comprises a conventional mail inserter 52, such as BELL & HOWELL's Mailstar Lettershop Special. A relatively small machine code reader 54, such as ACCU-SORT MODEL 20 made by ACCU-SORT SYSTEMS, INC., is installed on the appropriate portion of the inserter. The reader 54 can be directly connected to a printer 56 that has its own printer controller, such as ink jet printer MODEL 7400 series sold by FOXJET. The printing head portion thereof is positioned along the inserter to enable printing of a machine code on each of the return envelopes supplied.

In operation, a series of outgoing reply sweepstakes inserts and/or carrier envelopes are preprinted at least with a 10-digit ID number in a form of UPC or "POST-NOT" code. When a die cut windowed carrier envelope is used, the reply insert 3, as shown in FIG. 3, having the 10-digit ID number in a form of a machine code 4 is used as a control document. The reply insert also has the 10-digit ID number 5 itself printed so that the machine code can be visually identified and verified. When a regular closed carrier envelope 7 is used, as shown in FIG. 4, the carrier envelope 7 itself is used as a control document.

Specifically, the control document is fed to the inserter 52 so that the machine coder reader 54 can read the machine code ID number 4 printed thereon. Using the information read from the control document, the printer 56 prints the same 10 digit ID number, preferably in a form of POST-NOT code. The control document, the reply insert, along with any other documents such as order stamps that are to be mailed are transported and collected for insertion into the carrier envelope as shown in FIG. 2.

The stamps 6 are preferably supplied in a stampsheet with perforations for easy removal of the stamps. Specifically, as shown in FIG. 5, each stamp has a base substrate formed of a conventional stamp material such as paper or synthetic material and at least one ink coating 8, and an adhesive layer. The ink coating 8 contains a magnetic material, preferably ferrous oxide. In the present invention, each stamp can be manufactured using a six-color press where different colors are layered one upon another, layer by layer, similar to a silk screen printing process. However, only five colors are needed to print the image on the stamp and only one of the five colors needs to contain ferrous oxide. Preferably, black ink, one of the five colors, contains ferrous oxide. According to the present invention, the one remaining press can be used to add more magnetic black ink so that the stamps have a stronger magnetic strength, i.e., more ferrous oxide, for a greater reliability and more accurate detection. The magnetic coating is preferably "L-shaped" as shown in FIG. 5 rather than "I-shaped" to provide more accurate detection.

According to the present invention, all sweepstakes entries, whether with or without orders can be advantageously processed without opening the envelopes using the machine code printed on the outside face of the return envelope 2. Those individuals returning an envelope are automatically entered into the sweepstakes. And, only the envelopes containing orders, i.e., those in which magnetic stamps have been detected, need to be opened. Since the non-orders do not have to be opened at all, the mail process according to the present invention is efficient and less costly, eliminating outsorting completely for the non-order batch.

In operation, a contestant wishing to order would attach one or more of the magnetic stamps 6 corresponding to the item(s) to be ordered onto a sweepstakes reply insert 3 supplied to the contestant and mail the same using the supplied return envelope. On the other hand, a contestant wishing to just enter the sweepstakes without ordering would just enclose the sweepstakes entry insert 3 without any order stamp using the same return envelope. In either case, the contestant's ID number, perhaps in machine code form, will either appear on the return envelope, or be visible through the die-cut window.

The return envelopes 2 received from the postal service are collected and fed through the sorter 10, upon which the machine code reader 30 will read the machine code on the outside face of the envelope while the magnetic field detector 20 will detect presence or absence of any order stamp contained in each envelope. The magnetic ink detection and machine code reading are made substantially simultaneous. At this point, the identification machine code 4 printed on either the outside face of the return envelope 2, or visible through a die cut window on the envelope, can be matched with the contestant information contained in the database 40, including the sweepstakes number preselected for that contestant, for sweepstakes entry.

If the magnetic ink detector does not detect presence of any magnetic stamp in the sealed envelope, the sealed envelope is routed to a non-order batch 14. If the sorter detects presence of any magnetic stamp in the sealed envelope, it is routed to an order batch 12 where the envelope can be opened for the first time for order processing. At this point, the machine code on the insert can be read using an auxiliary machine code reader for identification verification and order processing.

Given the disclosure of the present invention, one versed in the art would readily appreciate the fact that there can be many other embodiments and modifications that are well within the scope and spirit of the disclosure set forth herein, but not specifically depicted and described. Accordingly, all expedient modifications readily attainable by one versed in the art from the disclosure set forth herein that are within the scope and spirit of the present invention are to be included as further embodiments of the present invention. The scope of the present invention accordingly is to be defined as set forth in the appended claims.

What is claimed is:

1. A method for processing mail in a sweepstakes contest comprising the steps of:

assigning a customer identification number to each of a plurality of recipients;

preparing a plurality of outgoing carrier envelopes, each containing at least magnetic stamps corresponding to items which can be ordered by a recipient, a reply insert having a first machine code printed thereon, and a return envelope having a second machine code printed on an outside face thereof, said first and second machine codes corresponding to said customer identification number;

mailing said outgoing carrier envelopes to said recipients;

receiving incoming return envelopes with reply inserts contained therein from at least some of said recipients;

machine reading said second machine code printed on the outside face of each incoming return envelope and matching said read second machine code with a database of said customer identification numbers;

detecting for the presence of a magnetic stamp in each of said incoming return envelopes; and sorting the incoming return envelopes into a first batch containing magnetic stamps, and a second batch not contained magnetic stamps, based on the outcome of the detection, said steps of machine reading, detecting and sorting being performed without opening said return envelope.

2. The method of claim 1, wherein the steps of machine reading the second machine code and detecting for the presence of magnetic stamps are conducted substantially simultaneously.

3. The method of claim 1, further comprising the steps of opening the envelopes in the first batch, and filling orders corresponding to the magnetic stamps contained in each of these envelopes.

4. The method of claim 1, further comprising the step of entering into the sweepstakes contest, recipients whose read second machine code is matched with their customer identification numbers.

5. The method of claim 1, wherein said second machine code is a post-not code.

6. The method of claim 1, wherein the step of preparing each outgoing carrier envelope includes the steps of printing a machine code on a first piece to be sent to the recipient;

machine reading said machine code printed on said first piece to be sent to the recipient;

printing another machine code corresponding to said read machine code on a second piece to be sent to the recipient; and inserting at least one of said first and second pieces into said outgoing carrier envelope.

7. A method according to claim 6, wherein said first piece is said outgoing carrier envelope and said second piece is the return envelope, the carrier envelope being preprinted with an address of the recipient.

8. A method according to claim 6, wherein said first piece is the reply insert and said second piece is the return envelope, wherein said first and second pieces are inserted into said carrier envelope.

9. A method according to claim 6, wherein said first and second machine codes are of different type.

10. A method according to claim 9, wherein said second machine code is a post-not code.

11. A method for processing mail in a sweepstakes contest comprising the steps of:

assigning a customer identification number to each of a plurality of recipients;

preparing a plurality of outgoing carrier envelopes, each containing at least magnetic stamps corresponding to items which can be ordered by a recipient, a reply insert having an identifying code printed thereon, said identifying code corresponding to said customer identification number, and a return envelope having a die-cut window formed therein;

mailing said outgoing carrier envelopes to said recipients;

receiving incoming return envelopes with reply inserts contained therein from at least some of said recipients, said identifying code being visible through said die-cut window;

machine reading said identifying code printed on said reply insert through said die cut window and matching said read identifying code with a database of said customer identification numbers;

detecting for the presence of a magnetic stamp in each of said incoming return envelopes; and sorting the incoming return envelopes into a first batch containing magnetic stamps, and a second batch not contained magnetic stamps, based on the outcome of the detection, said steps of machine reading, detecting and sorting being performed without opening said return envelope.

12. The method of claim 11, wherein the steps of machine reading the identifying code and detecting for the presence of magnetic stamps are conducted substantially simultaneously.

13. The method of claim 11, further comprising the step of entering into the sweepstakes contest, recipients whose read identifying code is matched with their customer identification numbers.

14. The method of claim 11, wherein the identifying code is the same as the customer identification number.

15. The method of claim 11, further comprising the steps of opening the envelopes in the first batch, and filling orders corresponding to the magnetic stamps contained in each of these envelopes.

16. A method for processing mail in a sweepstakes contest comprising the steps of:

assigning a customer identification number to each of a plurality of recipients;

preparing a plurality of outgoing carrier envelopes, each containing at least magnetic stamps corresponding to items which can be ordered by a recipient, a reply insert and a return envelope, one of said reply insert and said return envelope having printed thereon an identifying code corresponding to said customer identification number;

mailing said outgoing carrier envelopes to said recipients;

receiving incoming return envelopes with reply inserts contained therein from at least some of said recipients;

machine reading the identifying code printed on one of said reply insert and said return envelope and matching said read identifying code with a database of said customer identification numbers;

detecting for the presence of a magnetic stamp in each of said incoming return envelopes; and sorting the incoming return envelopes into a first batch containing magnetic stamps, and a second batch not contained magnetic stamps; based on the outcome of the detection, said steps of machine reading, detecting and sorting being performed without opening said return envelope.

17. The method of claim 16, wherein the steps of machine reading the identifying code and detecting for the presence of magnetic stamps are conducted substantially simultaneously.

18. The method of claim 16, further comprising the step of entering into the sweepstakes contest, recipients whose read identifying code is matched with their customer identification numbers.

19. The method of claim 16, further comprising the steps of opening the envelopes in the first batch, and filling orders corresponding to the magnetic stamps contained in each of these envelopes.

* * * * *